(12) United States Patent
Olson et al.

(10) Patent No.: US 11,708,868 B2
(45) Date of Patent: Jul. 25, 2023

(54) FAILSAFE MULTIMODE CLUTCH ASSEMBLIES FOR ROTORCRAFT

(71) Applicant: Textron Innovations Inc., Providence, RI (US)

(72) Inventors: Eric Stephen Olson, Fort Worth, TX (US); David Andrew Prater, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 73 days.

(21) Appl. No.: 17/494,356

(22) Filed: Oct. 5, 2021

(65) Prior Publication Data

US 2022/0025941 A1 Jan. 27, 2022

Related U.S. Application Data

(63) Continuation-in-part of application No. 17/037,512, filed on Sep. 29, 2020, now Pat. No. 11,174,014, and
(Continued)

(51) Int. Cl.
*F16D 41/08* (2006.01)
*F16D 41/07* (2006.01)
(Continued)

(52) U.S. Cl.
CPC .............. *F16D 41/07* (2013.01); *B64C 27/14* (2013.01); *B64D 35/04* (2013.01); *B64D 35/08* (2013.01);
(Continued)

(58) Field of Classification Search
CPC ......... B64C 27/14; B64C 27/82; B64C 27/12; B64C 2027/026; B64D 35/04; B64D 35/08; B64D 41/00; F16D 41/07; F16D 41/04; F16D 41/08; F16D 2041/0603; F16D 25/061; F16D 25/083; F16D 25/14; F16D 48/02; F16D 2048/0209; F16D 11/14
See application file for complete search history.

(56) References Cited

U.S. PATENT DOCUMENTS 3,362,255 A 1/1968 De et al.
3,455,182 A 7/1969 Kelley
(Continued)

*Primary Examiner* — Lori Wu
(74) *Attorney, Agent, or Firm* — Lawrence Youst PLLC

(57) ABSTRACT

A failsafe multimode clutch assembly positioned in a powertrain of a rotorcraft. The clutch assembly includes a freewheeling having a driving mode in which torque applied to the input race is transferred to the output race and an overrunning mode in which torque applied to the output race is not transferred to the input race. A bypass assembly has an engaged position that couples the input and output races of the freewheeling unit. An actuator assembly uses pressurized lubricating oil to shift the bypass assembly between the engaged position and a disengaged position. A lock assembly enables and disables actuation of the bypass assembly. In the disengaged position, the overrunning mode of the freewheeling unit enables a unidirectional torque transfer mode of the clutch assembly. In the engaged position, the overrunning mode of the freewheeling unit is disabled such that the clutch assembly is configured for bidirectional torque transfer.

20 Claims, 9 Drawing Sheets

Related U.S. Application Data a continuation-in-part of application No. 16/567,086, filed on Sep. 11, 2019, now Pat. No. 10,793,284, and a continuation-in-part of application No. 16/274,520, filed on Feb. 13, 2019, now Pat. No. 10,788,088.

(51) Int. Cl.

| | | |
|---|---|---|
| *F16D 11/14* | (2006.01) | |
| *F16D 25/061* | (2006.01) | |
| *F16D 25/08* | (2006.01) | |
| *F16D 48/02* | (2006.01) | |
| *B64C 27/14* | (2006.01) | |
| *B64D 35/04* | (2006.01) | |
| *B64D 35/08* | (2006.01) | |
| *F16D 41/04* | (2006.01) | |
| *F16D 121/04* | (2012.01) | |
| *B64D 27/02* | (2006.01) | |
| *F16D 1/10* | (2006.01) | |
| *F16D 41/06* | (2006.01) | |

(52) U.S. Cl.
CPC .......... *F16D 11/14* (2013.01); *F16D 25/061* (2013.01); *F16D 25/083* (2013.01); *F16D 25/14* (2013.01); *F16D 41/04* (2013.01); *F16D 41/08* (2013.01); *B64D 2027/026* (2013.01); *F16D 2001/103* (2013.01); *F16D 2041/0603* (2013.01); *F16D 2121/04* (2013.01)

(56) References Cited

U.S. PATENT DOCUMENTS

| | | | |
|---|---|---|---|
| 4,605,107 A | 8/1986 | Hallidy et al. | |
| 4,711,332 A | 12/1987 | Schuster | |
| 5,106,348 A * | 4/1992 | Koivunen | F16D 43/28 192/85.25 |
| 5,271,295 A | 12/1993 | Marnot | |
| 6,098,921 A | 8/2000 | Piasecki | |
| 6,313,625 B1 | 11/2001 | Varady et al. | |
| 8,950,700 B2 | 2/2015 | Westhuizen | |
| 9,580,184 B2 | 2/2017 | Bornes | |
| 10,040,566 B2 | 8/2018 | Waltner | |
| 10,788,088 B2 | 9/2020 | Olson et al. | |
| 10,793,284 B2 | 10/2020 | Prater et al. | |
| 11,174,013 B2 | 11/2021 | Olson et al. | |
| 11,174,014 B2 | 11/2021 | Olson | |
| 11,174,015 B2 | 11/2021 | Goodwin et al. | |
| 2002/0166744 A1* | 11/2002 | Nojiri | F16D 47/04 192/48.92 |
| 2006/0269414 A1 | 11/2006 | Palcic et al. | |
| 2008/0099294 A1* | 5/2008 | Lee | F16D 41/088 192/44 |
| 2009/0078525 A1 | 3/2009 | Schumacher et al. | |
| 2011/0048147 A1 | 3/2011 | Keech et al. | |
| 2016/0288779 A1 | 10/2016 | Kotloski et al. | |
| 2017/0327241 A1 | 11/2017 | Mitrovic et al. | |
| 2018/0086444 A1 | 3/2018 | Poster et al. | |
| 2018/0172088 A1 | 6/2018 | Peglowski et al. | |
| 2018/0202546 A1 | 7/2018 | Egashira et al. | |
| 2018/0313414 A1 | 11/2018 | Finkenzeller | |
| 2019/0032760 A1 | 1/2019 | Geiser et al. | |
| 2019/0368592 A1 | 12/2019 | Gostin, Jr. et al. | |
| 2020/0247553 A1 | 8/2020 | Prater et al. | |
| 2020/0248760 A1 | 8/2020 | Olson et al. | |
| 2021/0061452 A1 | 3/2021 | Olson et al. | |
| 2021/0061453 A1 | 3/2021 | Olson | |
| 2021/0070430 A1 | 3/2021 | Goodwin et al. | |

\* cited by examiner

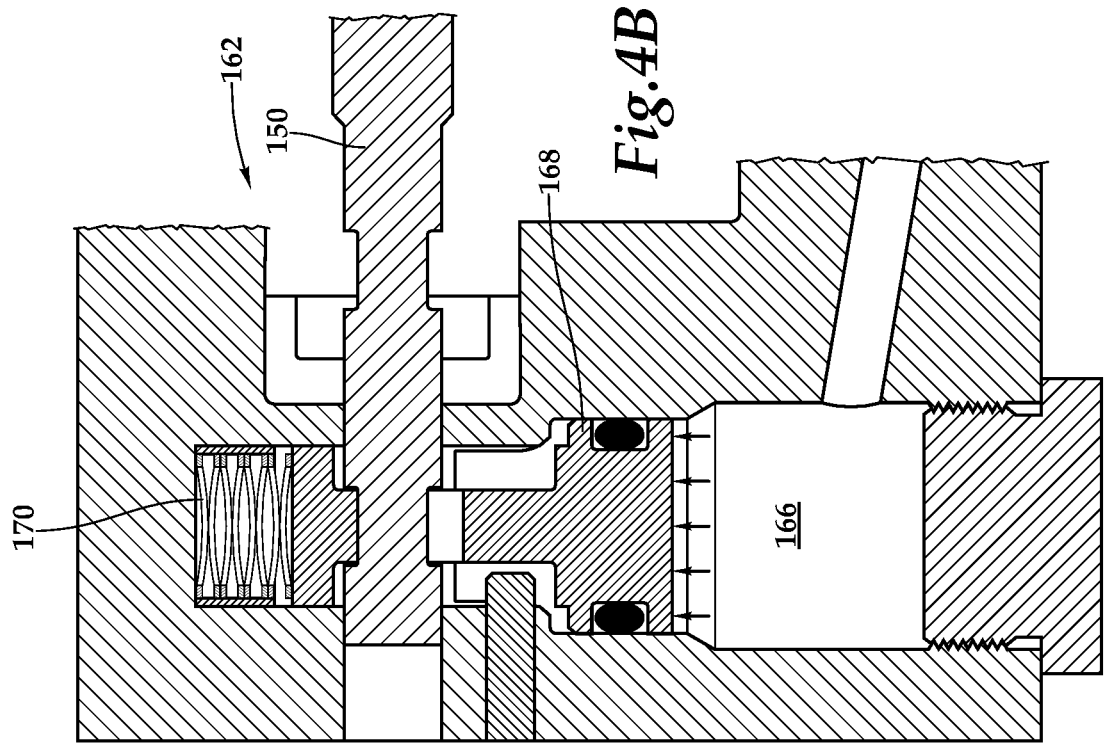
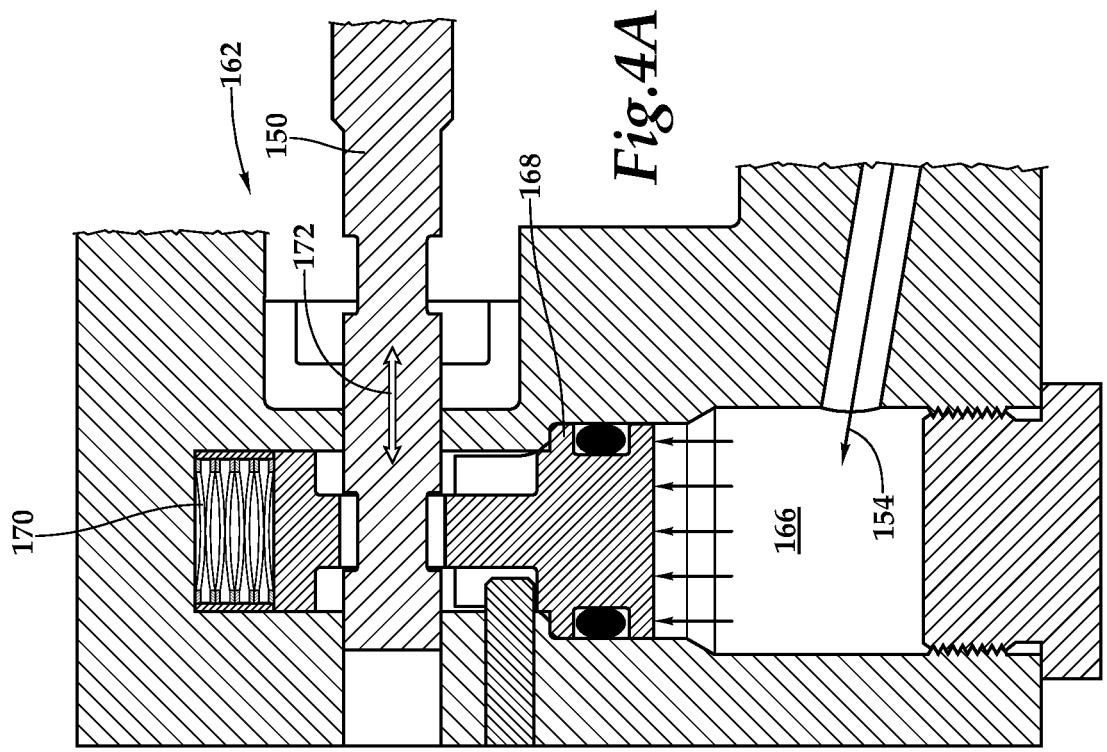

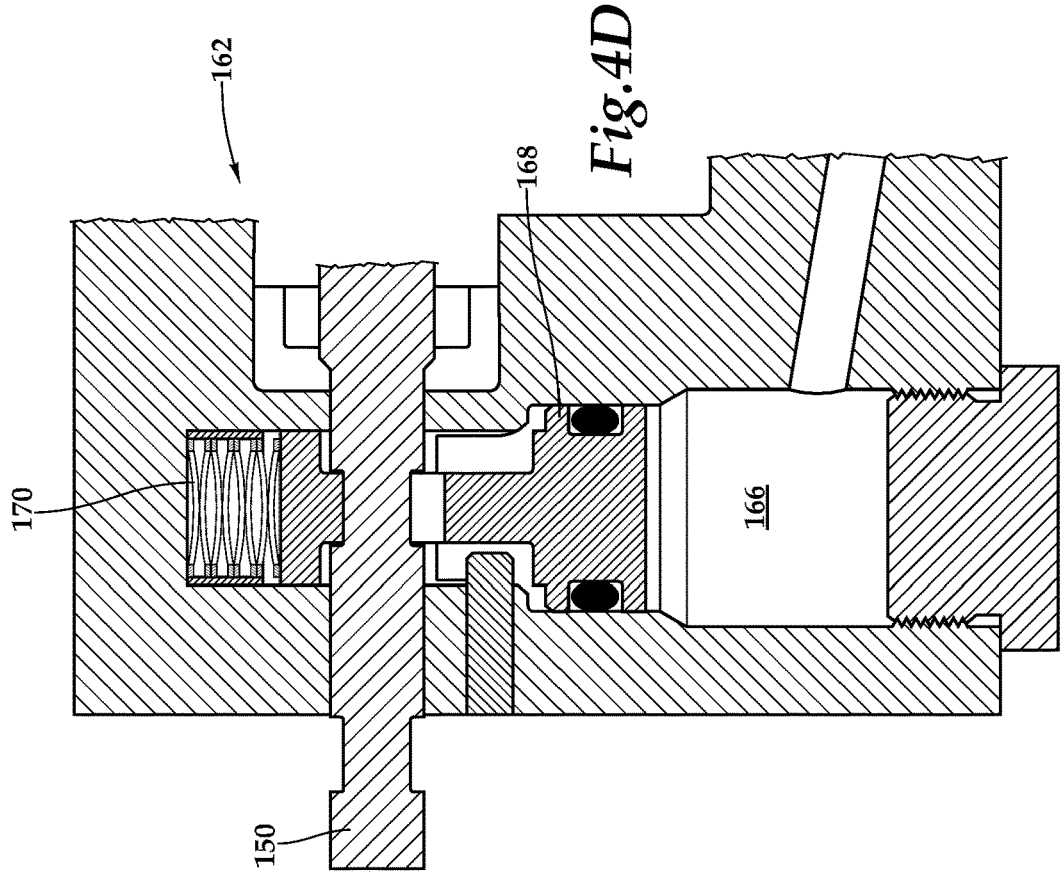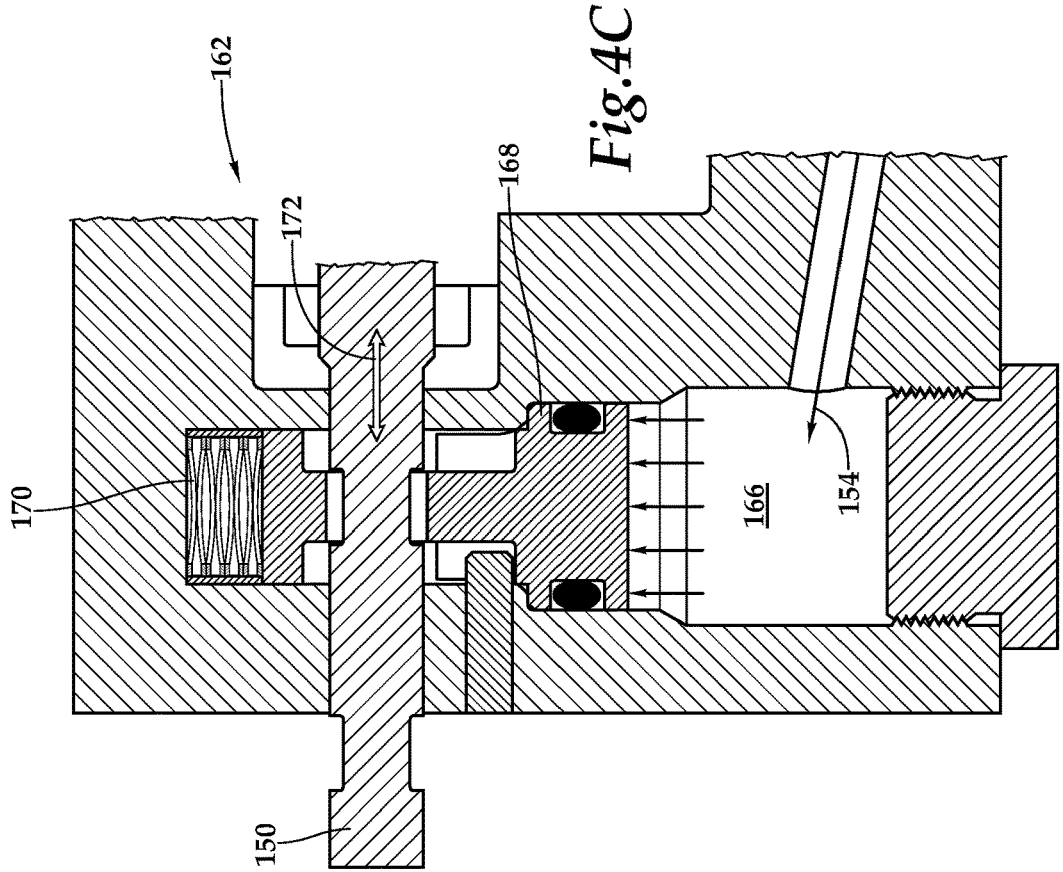

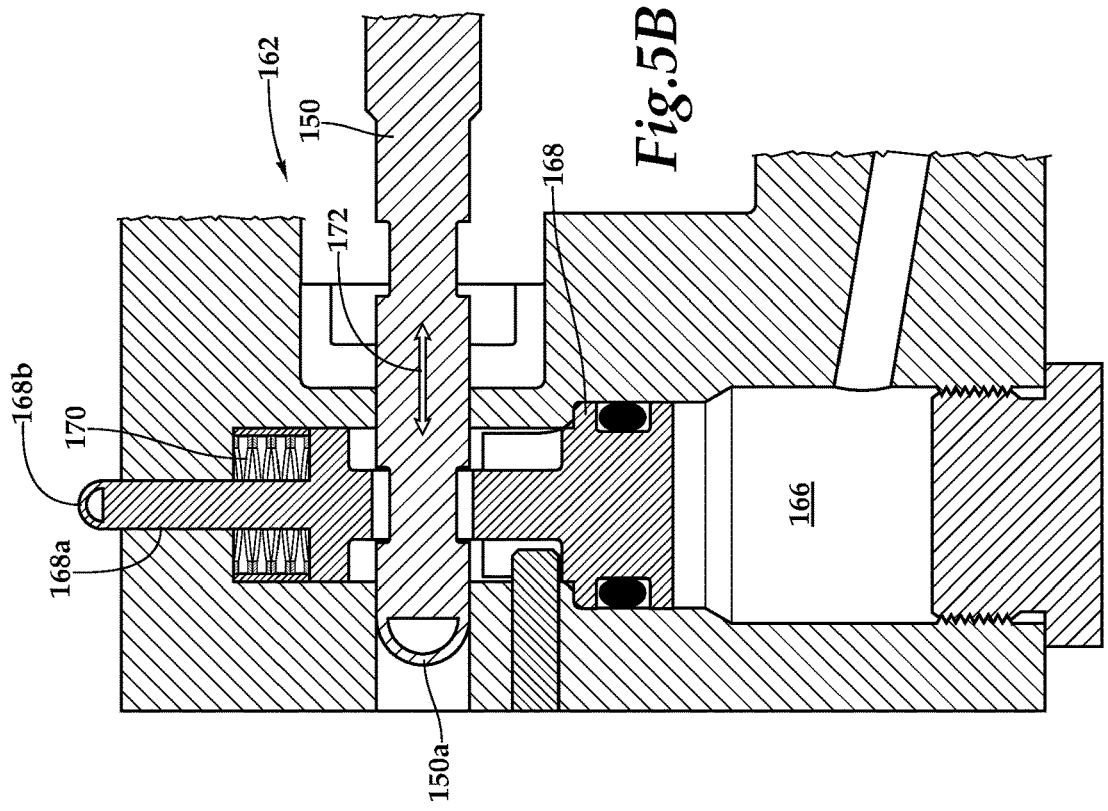
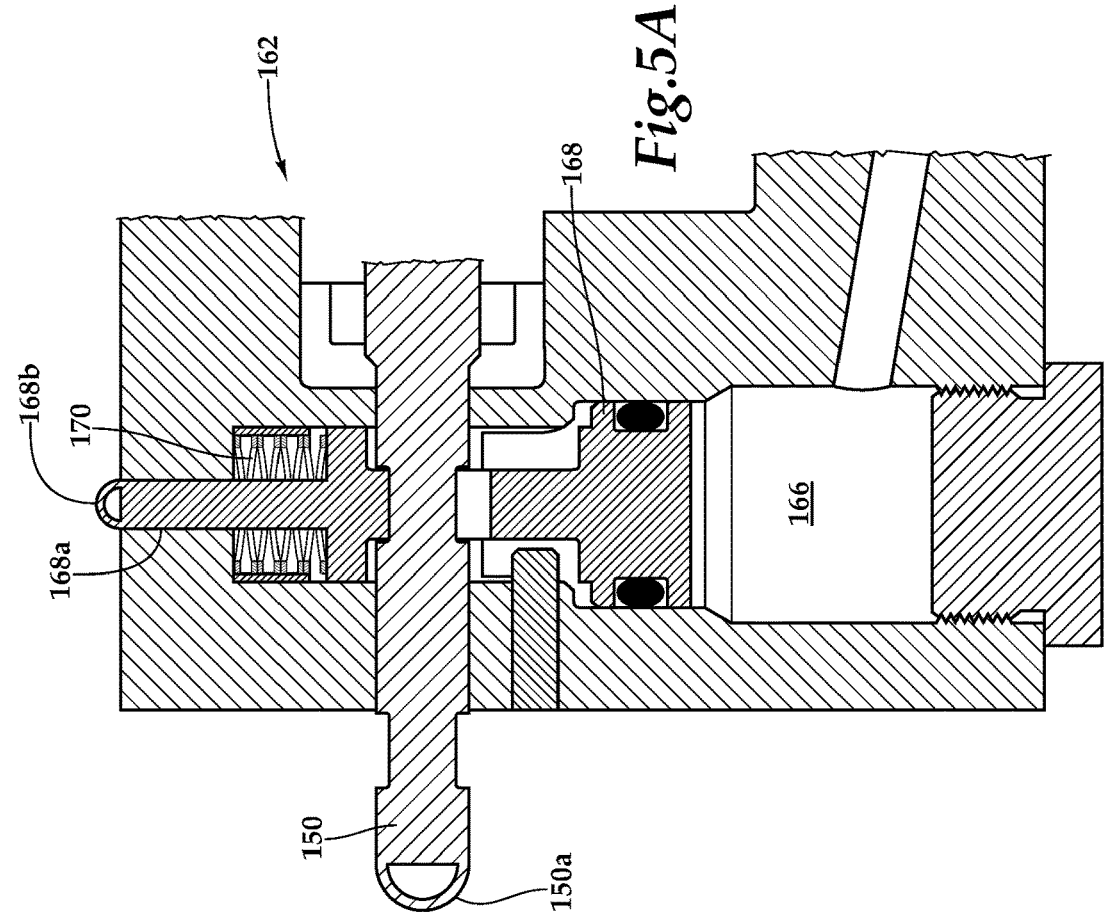

FAILSAFE MULTIMODE CLUTCH ASSEMBLIES FOR ROTORCRAFT

CROSS-REFERENCE TO RELATED APPLICATIONS

The present application is a continuation-in-part of co-pending application Ser. No. 17/037,512, filed Sep. 29, 2020, which is a continuation-in-part of application Ser. No. 16/567,086, filed Sep. 11, 2019, which is a continuation-in-part of application Ser. No. 16/274,520, filed Feb. 13, 2019, which claims the benefit of provisional application No. 62/801,621, filed Feb. 5, 2019, the entire contents of each are hereby incorporated by reference.

GOVERNMENT RIGHTS

This invention was made with Government support under Agreement No. W911W6-19-9-0002, awarded by the Army Contracting Command-Redstone Arsenal. The Government has certain rights in the invention.

TECHNICAL FIELD OF THE DISCLOSURE

The present disclosure relates, in general, to clutch assemblies operable for use on rotorcraft and, in particular, to failsafe multimode clutch assemblies operable to enable the selective use of secondary engine power independent of or together with main engine power to drive the main rotor, the tail rotor and/or the accessories of a rotorcraft.

BACKGROUND

Many rotorcraft are capable of taking off, hovering and landing vertically. One such rotorcraft is a helicopter, which has a main rotor that provides lift and thrust to the aircraft. The main rotor not only enables hovering and vertical takeoff and landing, but also enables forward, backward and lateral flight. These attributes make helicopters highly versatile for use in congested, isolated or remote areas. It has been found that the power demand of a rotorcraft can vary significantly based upon the operation being performed. For example, low power demand exists during preflight operations, when power is only needed to operate accessories such as generators, air pumps, oil pumps, hydraulic systems and the like as well as to start the main engine. Certain rotorcraft utilize a dedicated auxiliary power unit to generate preflight accessory power. During takeoff, hover, heavy lifts and/or high speed operations, rotorcraft experience high power demand. Certain rotorcraft utilize multiple main engines or one main engine and a supplemental power unit to generate the required power for the main rotor during such high power demand flight operations. In conventional rotorcraft, the dedicated auxiliary power unit is not operable to provide supplemental power to the main rotor during high power demand flight operations. Accordingly, a need has arisen for improved rotorcraft systems that enable an auxiliary power unit to not only provide accessory power during preflight operations but also to operate as a supplemental power unit to provide power to the main rotor during high power demand flight operations.

SUMMARY

In a first aspect, the present disclosure is directed to a failsafe multimode clutch assembly for a rotorcraft. The clutch assembly includes a freewheeling unit having an input race and an output race. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. An actuator assembly is configured to utilize a pressurized lubricating oil to generate an engagement signal that biases the bypass assembly toward the engaged position and a disengagement signal that biases the bypass assembly toward the disengaged position. A lock assembly is in fluid communication with the engagement signal. The lock assembly enables actuation of the bypass assembly when the engagement signal is present and disables actuation of the bypass assembly when the engagement signal is absent. In the disengaged position of the bypass assembly, the overrunning mode of the freewheeling unit is enabled such that the clutch assembly is configured for unidirectional torque transfer from the input race to the output race. In the engaged position of the bypass assembly, the overrunning mode of the freewheeling unit is disabled such that the clutch assembly is configured for bidirectional torque transfer between the input and output races.

In some embodiments, the actuator assembly may include a liner and a piston wherein the piston is slidably disposed relative to the liner and is coupled to the bypass assembly. In such embodiments, the piston and the liner may define engagement and disengagement chambers wherein, when the pressurized lubricating oil pressurizes the engagement chamber and does not pressurize the disengagement chamber, the bypass assembly is biased toward the engaged position and wherein, when the pressurized lubricating oil pressurizes both the engagement and disengagement chambers, the bypass assembly is biased toward the disengaged position. In certain embodiments, the engagement chamber and the disengagement chamber may define differential areas wherein, the disengagement chamber has a larger area than the engagement chamber. In some embodiments, the engagement chamber and the disengagement chamber may define annular differential areas wherein, the disengagement chamber has a larger annular area than the engagement chamber.

In certain embodiments, a control valve may be disposed between a pressurized lubricating oil source and the disengagement chamber. In such embodiments, the control valve may be configured to selectively allow and prevent communication of the pressurized lubricating oil to the disengagement chamber. Also, in such embodiments, the control valve may be configured to selectively allow and prevent discharge of the pressurized lubricating oil from the disengagement chamber. In some embodiments, the lock assembly may include a spool valve and the piston may include a spool assembly. In such embodiments, the lock assembly may have an unlocked position in which the spool assembly is slidable relative to the spool valve when the engagement signal is present, thereby enabling actuation of the bypass assembly. Also, in such embodiments, the lock assembly may have a locked position in which the spool assembly is fixed relative to the spool valve when the engagement signal is absent, thereby disabling actuation of the bypass assembly. In certain embodiments, the spool valve may include a spring assembly and a spool valve piston. In such embodiments, the spring assembly may bias the spool valve piston toward the locked position to provide a failsafe configuration when the engagement signal is absent. Also, in such embodiments, the spool valve piston may be in fluid communication with the engagement chamber such that the spool valve piston is biased toward the unlocked position when the engagement signal acts on the spool valve piston.

In a second aspect, the present disclosure is directed to a powertrain for a rotorcraft. The powertrain has a main drive system including a main engine. The powertrain also has a secondary engine and a failsafe multimode clutch assembly that is positioned between the main drive system and the secondary engine. The clutch assembly includes a freewheeling unit having an input race coupled to the main drive system and an output race coupled to the secondary engine. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. An actuator assembly is configured to utilize a pressurized lubricating oil to generate an engagement signal that biases the bypass assembly toward the engaged position and a disengagement signal that biases the bypass assembly toward the disengaged position. A lock assembly is in fluid communication with the engagement signal. The lock assembly enables actuation of the bypass assembly when the engagement signal is present and disables actuation of the bypass assembly when the engagement signal is absent. In the disengaged position of the bypass assembly, the overrunning mode of the freewheeling unit is enabled such that the clutch assembly is configured for unidirectional torque transfer from the input race to the output race. In the engaged position of the bypass assembly, the overrunning mode of the freewheeling unit is disabled such that the clutch assembly is configured for bidirectional torque transfer between the input and output races.

In some embodiments, the main engine may be a gas turbine engine and the secondary engine may be a gas turbine engine. In other embodiments, the main engine may be a gas turbine engine and the secondary engine may be an electric motor. In certain embodiments, the secondary engine may be configured to generate between about 5 percent and about 20 percent of the power of the main engine or between about 10 percent and about 15 percent of the power of the main engine.

In a third aspect, the present disclosure is directed to a rotorcraft. The rotorcraft includes a main rotor coupled to a main drive system including a main engine. The rotorcraft also includes a secondary engine and a failsafe multimode clutch assembly that is positioned between the main drive system and the secondary engine. The clutch assembly includes a freewheeling unit having an input race coupled to the main drive system and an output race coupled to the secondary engine. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. An actuator assembly is configured to utilize a pressurized lubricating oil to generate an engagement signal that biases the bypass assembly toward the engaged position and a disengagement signal that biases the bypass assembly toward the disengaged position. A lock assembly is in fluid communication with the engagement signal. The lock assembly enables actuation of the bypass assembly when the engagement signal is present and disables actuation of the bypass assembly when the engagement signal is absent. In the disengaged position of the bypass assembly, the overrunning mode of the freewheeling unit is enabled such that the clutch assembly is configured for unidirectional torque transfer from the input race to the output race. In the engaged position of the bypass assembly, the overrunning mode of the freewheeling unit is disabled such that the clutch assembly is configured for bidirectional torque transfer between the input and output races.

In a preflight configuration of the rotorcraft, the bypass assembly is in the disengaged position, the main engine is not operating and the secondary engine provides power to at least one rotorcraft accessory. In an enhanced power configuration of the rotorcraft, the bypass assembly is in the engaged position, the main engine provides power to the main drive system and the secondary engine provides power to at least one rotorcraft accessory and to the main drive system through the clutch assembly. In a high efficiency configuration of the rotorcraft, the bypass assembly is in the engaged position, the secondary engine is in standby mode and the main engine provides power to the main drive system and to at least one rotorcraft accessory through the clutch assembly. In an enhanced autorotation configuration of the rotorcraft, the bypass assembly is in the engaged position, the main engine is not operating and the secondary engine provides power to the main drive system through the clutch assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4D are cross sectional views of a lock assembly for a multimode clutch assembly in various operating configurations in accordance with embodiments of the present disclosure; and FIGS. 5A-5B are cross sectional views of a lock assembly for a multimode clutch assembly in various operating configurations in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
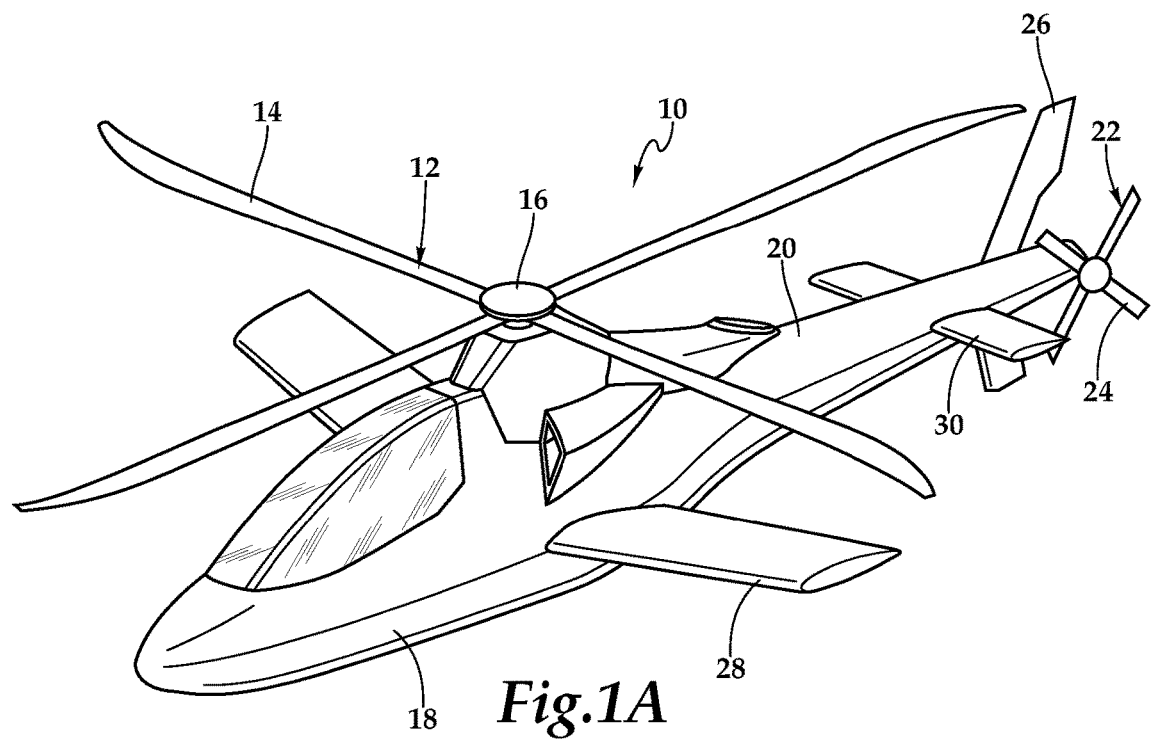
FIGS. 1A-1C are schematic illustrations of a rotorcraft having a multimode clutch assembly in accordance with embodiments of the present disclosure.
Figure 1B:
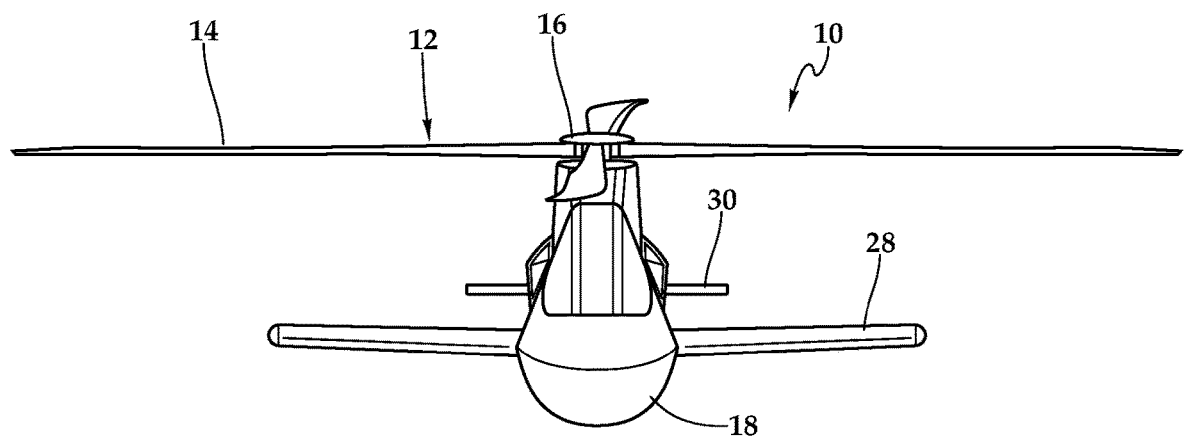
Figure 1C:
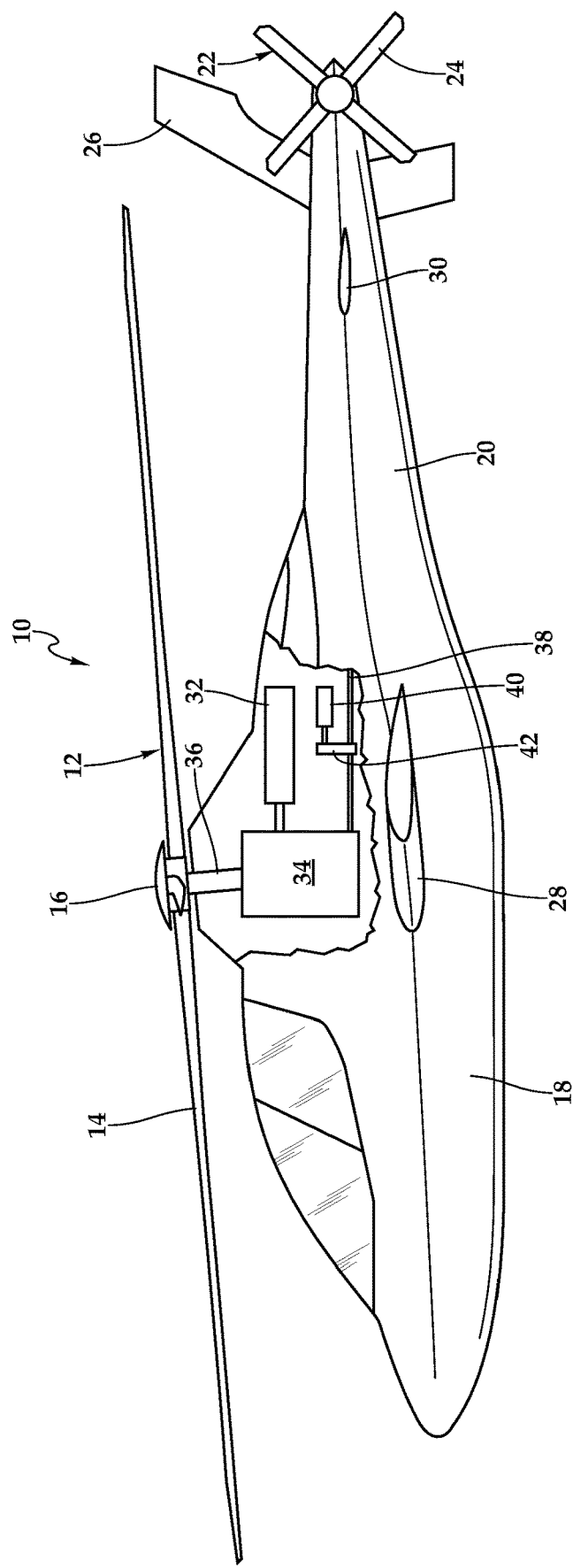

Referring to FIGS. 1A-1C in the drawings, a rotorcraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust and lift of helicopter 10. A tailboom 20 is coupled to fuselage 18 and extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provide stabilization to helicopter 10 during high speed forward flight. In addition, helicopter 10 includes wing members 28 that extend laterally from fuselage 18 and wing members 30 that extend laterally from tailboom 20. Wing members 28, 30 provide lift to helicopter 10 responsive to the forward airspeed of helicopter 10, thereby reducing the lift requirement on main rotor assembly 12 and increasing the top speed of helicopter 10

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a secondary engine 40 is coupled to tail rotor drive shaft 38 by a secondary gearbox 42. Together, main engine 32, main rotor gearbox 34, tail rotor drive shaft 38, secondary engine 40 and secondary gearbox 42 as well as various other shafts and gearboxes coupled therein may be considered as the powertrain of helicopter 10.

Secondary engine 40 is operable as an auxiliary power unit to provide preflight power to the accessories of helicopter 10 such as electric generators, air pumps, oil pumps, hydraulic systems and the like as well as to provide the power required to start main engine 32. In addition, secondary engine 40 is operable to provide supplemental power to main rotor assembly 12 that is additive with the power provided by main engine 32 during, for example, high power demand conditions including takeoff, hover, heavy lifts and high speed flight operations. Secondary engine 40 is also operable to provide emergency power to main rotor assembly 12. For example, in the event of a failure of main engine 32, secondary engine 40 is operable to provide emergency power to enhance the autorotation and flare recovery maneuver of helicopter 10. Use of secondary engine 40 not only enhances the safety of helicopter 10 but also increases the efficiency of helicopter 10. For example, having the extra power provided by secondary engine 40 during high power demand operations allows main engine 32 to be downsized for more efficient single engine operations such as during cruise operations.

It should be appreciated that helicopter 10 is merely illustrative of a variety of aircraft that can implement the embodiments disclosed herein. Indeed, the multimode clutch assembly of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones and the like. As such, those skilled in the art will recognize that the multimode clutch assembly of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2A:
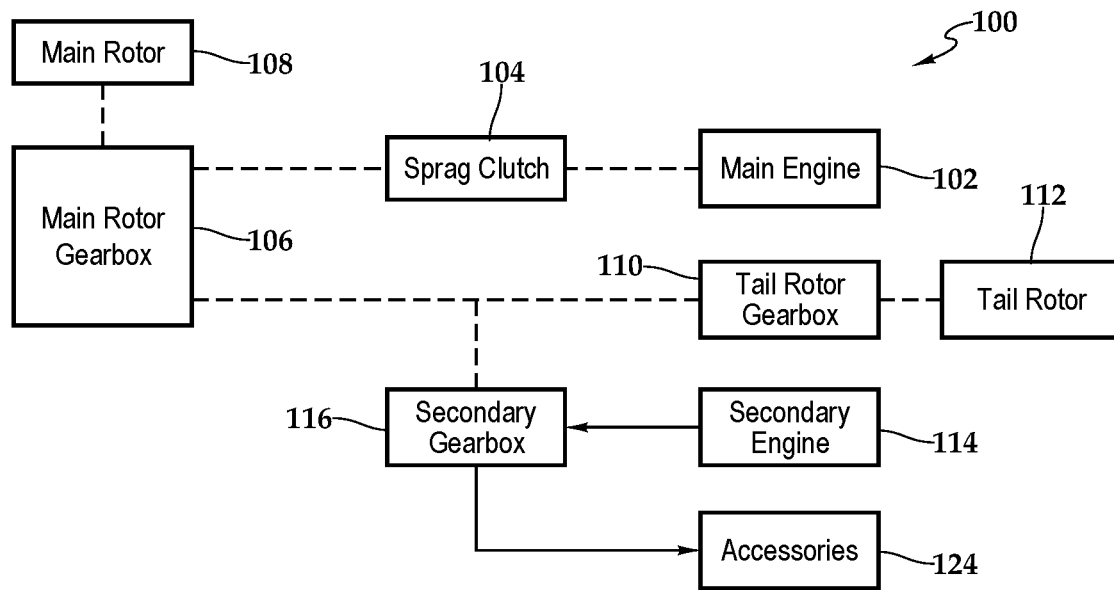
FIGS. 2A-2E are block diagrams of a powertrain including a multimode clutch assembly for a rotorcraft in various operating configurations in accordance with embodiments of the present disclosure.

Referring to FIG. 2A in the drawings, a powertrain 100 of a rotorcraft, such as rotorcraft 10, is illustrated in a block diagram format. Powertrain 100 includes a main engine 102 such as a turbo shaft engine capable of producing 2000 to 4000 horsepower or more, depending upon the particular implementation. Main engine 102 is coupled to a freewheeling unit depicted as sprag clutch 104 that acts as a one-way clutch enabling a driving mode in which torque from main engine 102 is coupled to main rotor gearbox 106 when the rotating speed of the input race, on the main engine side of sprag clutch 104, is matched with the rotating speed of the output race, on the main rotor gearbox side of sprag clutch 104. Importantly, sprag clutch 104 has an overrunning mode in which main engine 102 is decoupled from main rotor gearbox 106 when the rotating speed of the input race is less than the rotating speed of the output race of sprag clutch 104. Operating sprag clutch 104 in the overrunning mode allows, for example, main rotor 108 to engage in autorotation in the event of a failure of main engine 102.

In the illustrated embodiment, main rotor gearbox 106 is coupled to sprag clutch 104 via a suitable drive shaft. In addition, main rotor gearbox 106 is coupled to main rotor 108 by a suitable mast. Main rotor gearbox 106 includes a gearbox housing and a plurality of gears, such as planetary gears, used to adjust the engine output speed to a suitable rotor speed so that main engine 102 and main rotor 108 may each rotate at optimum speed during flight operations. Main rotor gearbox 106 is coupled to a tail rotor gearbox 110 via a suitable tail rotor drive shaft. Tail rotor gearbox 110 includes a gearbox housing and a plurality of gears that may adjust the main rotor gearbox output speed to a suitable rotational speed for operation of tail rotor 112. Main engine 102, sprag clutch 104, main rotor gearbox 106 and tail rotor gearbox 110 as well as various shafts and gearing systems coupled therewith may be considered the main drive system of powertrain 100.

Powertrain 100 also includes a secondary engine 114 such as a turbo shaft engine or an electric motor capable of producing 200 to 400 horsepower or more, depending upon the particular implementation. In the illustrated embodiment, secondary engine 114 may generate between about 5 percent and about 20 percent or more of the horsepower of main engine 102. In other embodiments, secondary engine 114 may generate between about 10 percent and about 15 percent of the horsepower of main engine 102. Secondary engine 114 is coupled to a secondary gearbox 116. Secondary engine 114 and secondary gearbox 116 as well as various shafts and gearing systems coupled therewith may be considered the secondary drive system of powertrain 100.

Figure 3A:
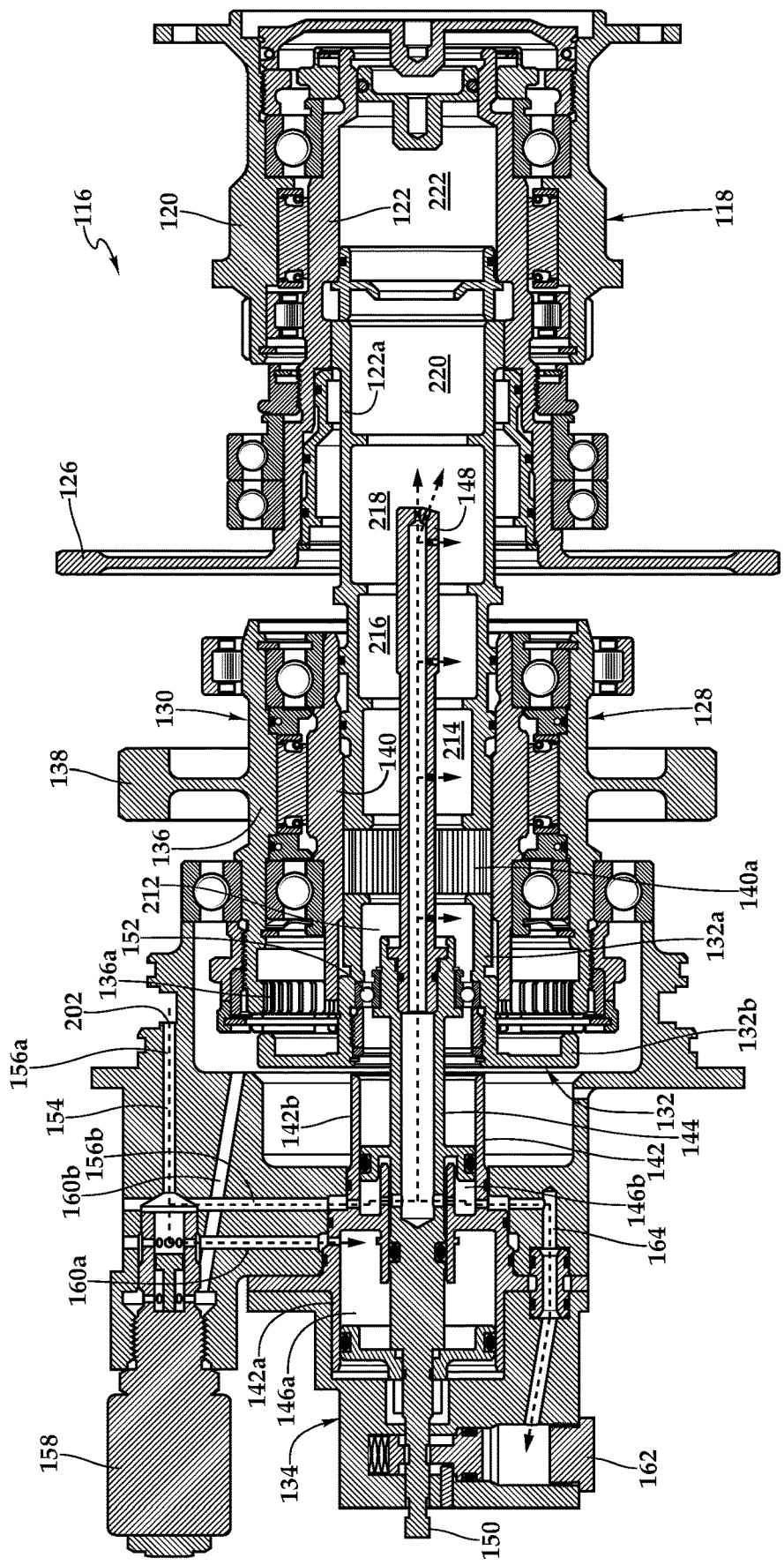
FIGS. 3A-3B are cross sectional views of a rotorcraft gearbox assembly including a multimode clutch assembly in various operating configurations in accordance with embodiments of the present disclosure.

Referring additionally to FIG. 3A, secondary gearbox 116 includes a freewheeling unit depicted as sprag clutch 118 that acts as a one-way clutch enabling a driving mode in which torque from secondary engine 114 is coupled through sprag clutch 118 from an input race 120 to an output race 122. In the illustrated embodiment, output race 122 is coupled to an output gear 126 that provides power to accessories 124 such as one or more generators, air pumps, oil pumps, hydraulic systems and the like. Sprag clutch 118 has an overrunning mode in which secondary engine 114 is decoupled from torque transfer through sprag clutch 118 when the rotating speed of input race 120 is less than the rotating speed of output race 122. Operating sprag clutch 118 in the overrunning mode allows, for example, main engine 102 to drive accessories 124 when secondary engine 114 is in standby mode or not operating, as discussed herein.

Secondary gearbox 116 includes a multimode clutch assembly 128 that is coaxially aligned with sprag clutch 118 and secondary engine 114, in the illustrated embodiment. In other embodiments, multimode clutch assembly 128 may operate on a separate axis than sprag clutch 118 and/or secondary engine 114. Multimode clutch assembly 128 has a unidirectional torque transfer mode and a bidirectional torque transfer mode. In the illustrated embodiment, multimode clutch assembly 128 includes a freewheeling unit depicted as sprag clutch 130, a bypass assembly 132 and an actuator assembly 134. Sprag clutch 130 has an input race 136 that is coupled to main rotor gearbox 106 via the tail rotor drive shaft and one or more gears including input gear 138. Sprag clutch 130 has an output race 140 that is coupled to output race 122 of sprag clutch 118 via shaft 122a. Shaft 122a has outer splines (not visible) that are coupled to inner splines 140a of output race 140. Likewise, shaft 122a has outer splines (not visible) that are coupled to inner splines (not visible) of output race 122. Sprag clutch 130 may act as a one-way clutch enabling a driving mode in which torque from the main drive system is coupled through sprag clutch 130 from input race 136 to output race 140. Sprag clutch 130 also has an overrunning mode in which the main drive system is decoupled from torque transfer with sprag clutch 130 when the rotating speed of input race 136 is less than the rotating speed of output race 140 of sprag clutch 130. When sprag clutch 130 is acting as a one-way clutch, multimode clutch assembly 128 is in its unidirectional torque transfer mode. In the unidirectional torque transfer mode of multimode clutch assembly 128, torque can be driven from the main drive system through secondary gearbox 116 but torque cannot be driven from secondary gearbox 116 to the main drive system of powertrain 100.

Figure 3B:
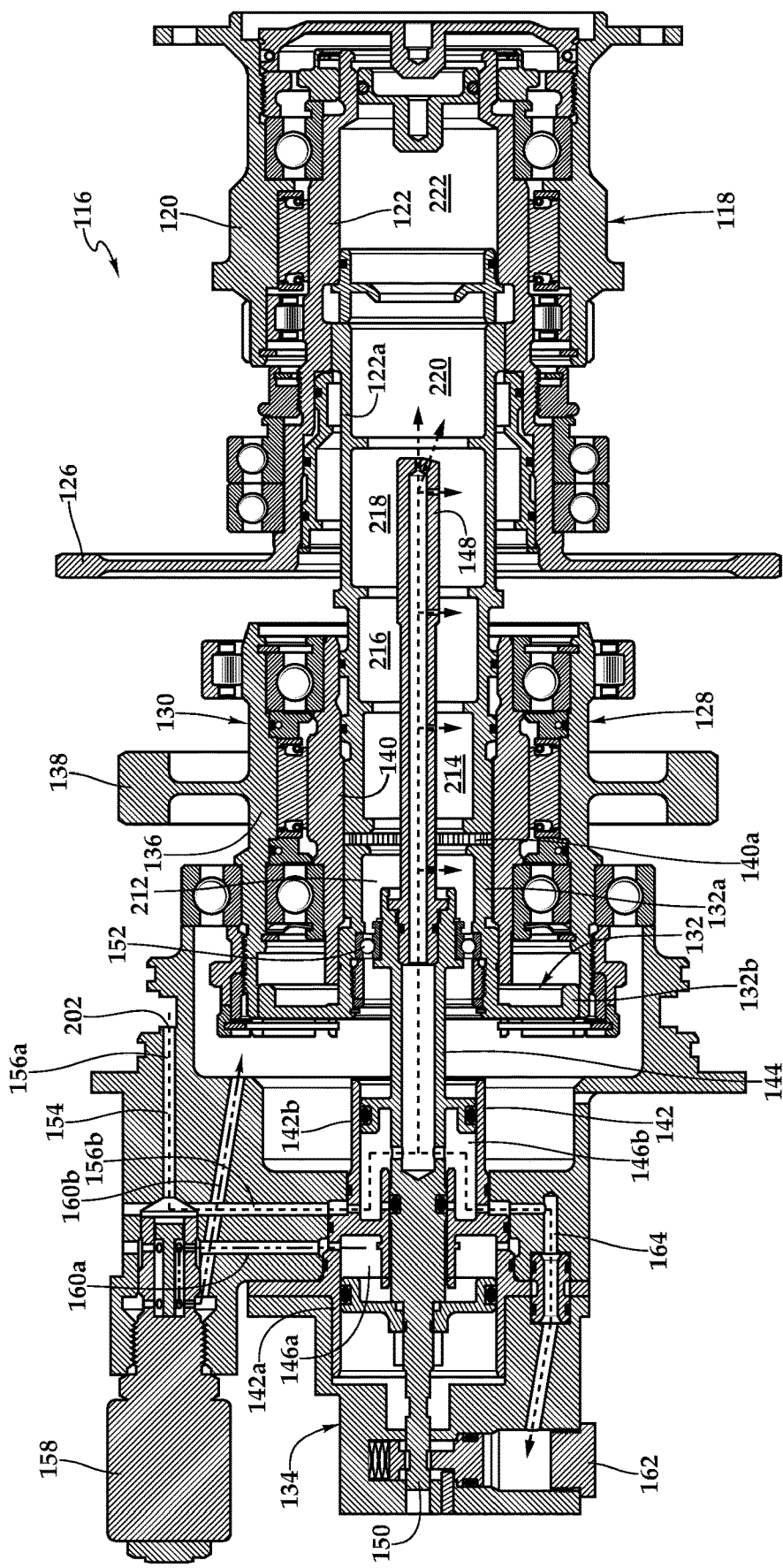

Referring additionally to FIG. 3B, the overrunning mode of multimode clutch assembly 128 can be disabled by engaging bypass assembly 132 to couple input race 136 and output race 140 of sprag clutch 130 to functionally form a connected shaft. In this configuration with bypass assembly 132 preventing sprag clutch 130 from operating in the overrunning mode, multimode clutch assembly 128 is in its bidirectional torque transfer mode. In the bidirectional torque transfer mode of multimode clutch assembly 128, torque can be driven from the main drive system through secondary gearbox 116 and torque can be driven from secondary gearbox 116 to the main drive system of powertrain 100.

Multimode clutch assembly 128 is operated between the unidirectional and bidirectional torque transfer modes by actuating bypass assembly 132 between its disengaged position (FIG. 3A) and its engaged position (FIG. 3B). The actuation of bypass assembly 132 may be pilot controlled and/or may be automated by the flight control computer of helicopter 10 and may be determined according to the operating conditions of helicopter 10. In the illustrated embodiment, bypass assembly 132 is actuated between the engaged and disengaged positions responsive to engagement and disengagement signals supplied by actuator assembly 134, which is depicted as a hydraulic actuator that is in fluid communication with the pressurized lubricating oil system of secondary gearbox 116.

In the illustrated embodiment, actuator assembly 134 includes an actuator liner 142 that is fixed relative to the housing of secondary gearbox 116. Liner 142 has a generally cylindrical section 142a that has a first diameter and a generally cylindrical section 142b that has a second diameter that is less than the first diameter. A piston 144 is slidably and sealingly received within actuator liner 142. More specifically, piston 144 is slidably and sealingly received within generally cylindrical section 142a forming a disengagement chamber 146a. In addition, piston 144 is slidably and sealingly received within generally cylindrical section 142b forming an engagement chamber 146b. In the illustrated embodiment, piston 144 is coupled to a piston extension depicted as an oil jet 148. In other embodiments, piston 144 and oil jet 148 may be integral or oil jet 148 may be omitted. On the opposite end of piston 144 from oil jet 148 is a spool assembly 150. A bearing assembly depicted as a ball bearing set 152 couples piston 144 with bypass assembly 132 such that bypass assembly 132 translates with piston 144 and is rotatable relative to piston 144 as well as the other components of actuator assembly 134. In the illustrated embodiment, the inner race of ball bearing set 152 has an anti-rotation coupling with piston 144. Actuator assembly 134 utilizes the pressurized lubricating oil system of secondary gearbox 116 to causes piston 144 to shift relative to actuator liner 142 between first and second positions. Shifting piston 144 causes bypass assembly 132 to shift between the engaged and disengaged positions with sprag clutch 130. More specifically, bypass assembly 132 includes a shaft 132a having outer splines (not visible) and a ring gear 132b having outer splines (not visible). The outer splines of shaft 132a are in mesh with inner splines 140a of output race 140 of sprag clutch 130 such that when output race 140 is rotating, bypass coupling 132 also rotates. The outer splines of ring gear 132b are selectively engaged with and disengaged from inner splines 136a (see FIG. 3A) of input race 136 to operate multimode clutch assembly 128 between the unidirectional and bidirectional torque transfer modes.

Returning to FIGS. 2A-2E, operating scenarios for helicopter 10 will now be described. In FIG. 2A, powertrain 100 is in a preflight configuration in which main engine 102 is not yet operating as indicated by the dashed lines between the components of the main drive system. As the main drive system is not turning, no torque is being applied to secondary gearbox 116 from the main drive system as indicated by the dashed line therebetween. Prior to starting secondary engine 114, an engagement status of bypass assembly 132 should be checked. In the illustrated embodiment, one or more engagement status sensors (not visible) are used to determine the engagement status of bypass assembly 132 by measuring the position of spool assembly 150. For example, the engagement status sensors may be mechanical position sensors, optical position sensors, magnetic position sensors or other suitable position sensing means. In other embodiments, one or more engagement status sensors may be located in relative to other components and/or other types of engagement status sensors may be used to determine the engagement status of bypass assembly 132. In addition to determining the engagement status of bypass assembly 132 in pre-flight, the use of an engagement status sensor is also beneficial in determining, for example, a malfunction of actuator assembly 134, partial engagement or disengagement of bypass assembly 132 or disengagement of bypass assembly 132 during flight, as well as other undesirable conditions.

Preferably, bypass assembly 132 is shifted from the engage position (FIG. 3B) to the disengaged position (FIG. 3A) after landing as part of a shutdown procedure. If following the status check, however, it is determined that bypass assembly 132 is in the engaged position, actuator assembly 134 may be used to shift piston 144 to the disengaged position shown in FIG. 3A, if pressurized lubricating oil is available. Alternatively, other automated or manual procedures, as discussed herein, may be used to shift bypass assembly 132 to the disengaged position. If following the status check it is determined that bypass assembly 132 is in the disengaged position and thus multimode clutch assembly 128 is in the unidirectional torque transfer mode, secondary engine 114 may be started. Secondary engine 114 now provides torque and rotational energy within the secondary drive system, as indicated by the arrows between secondary engine 114, secondary gearbox 116 and accessories 124, in FIG. 2A. More specifically, secondary engine 114 is driving input race 120 of sprag clutch 118, which causes output race 122 of sprag clutch 118 to drive output gear 126 which in turn provides power to accessories 124. It is noted that rotation of output race 122 causes rotation of shaft 122a which in turn causes rotation of output race 140 of sprag clutch 130, which is operating in its overrunning mode. In addition, rotation of shaft 122a causes rotation of bypass assembly 132 via inner splines 140a. While operating in the preflight configuration, the pilot of helicopter 10 can proceed through the startup procedure. Prior to starting main engine 102, the status of multimode clutch assembly 128 may be checked again. This process step provides further assurance that bypass assembly 132 is secured in the disengaged position prior to starting main engine 102.

Figure 2B:
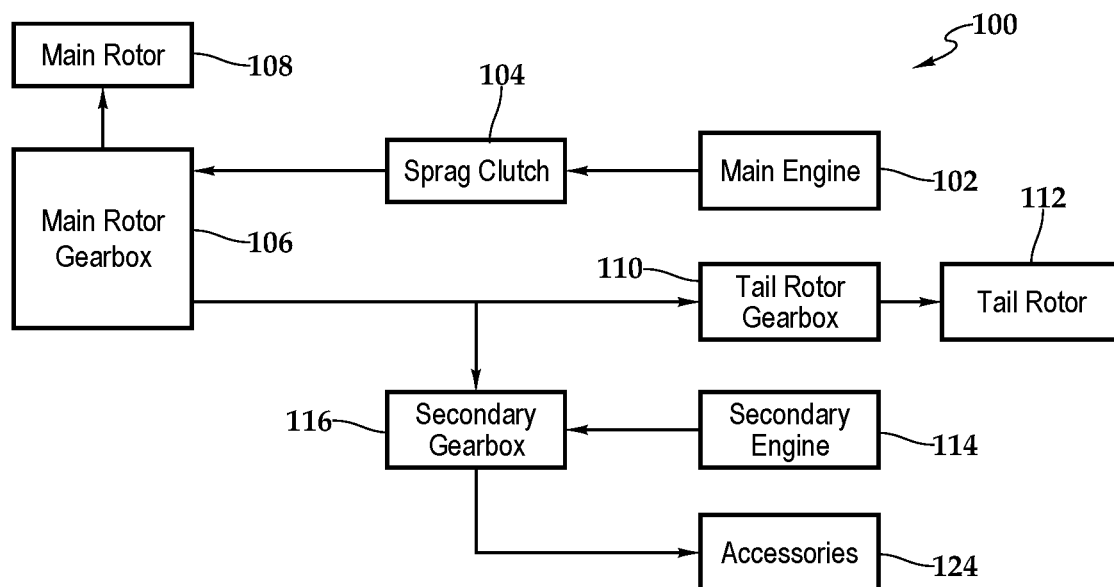
Figure 2C:
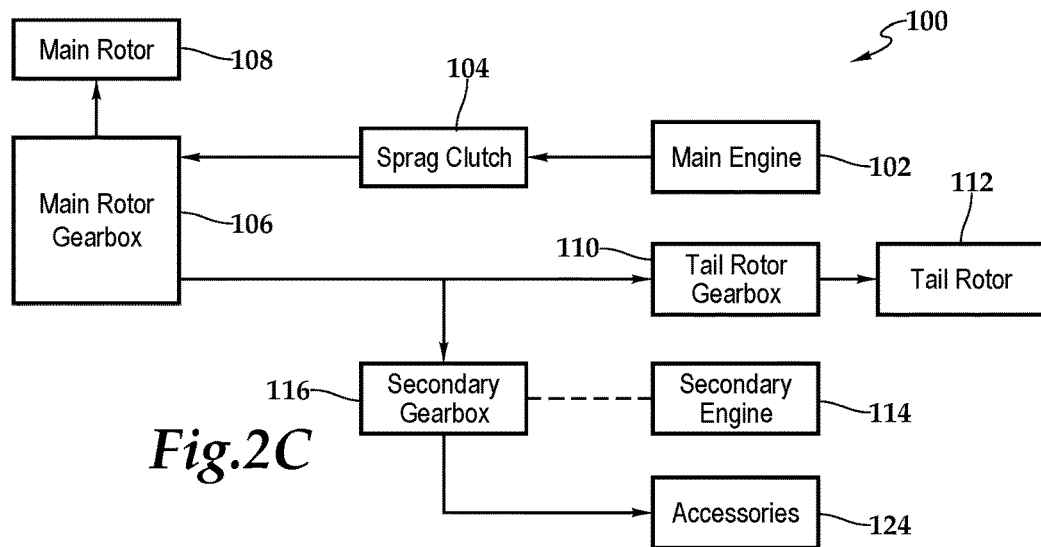
Figure 2D:
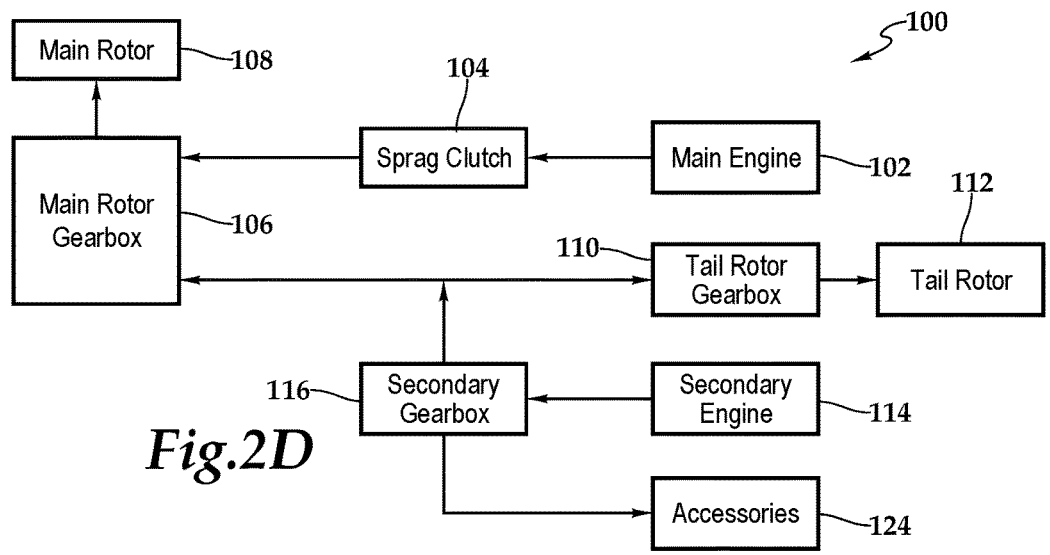
Figure 2E:
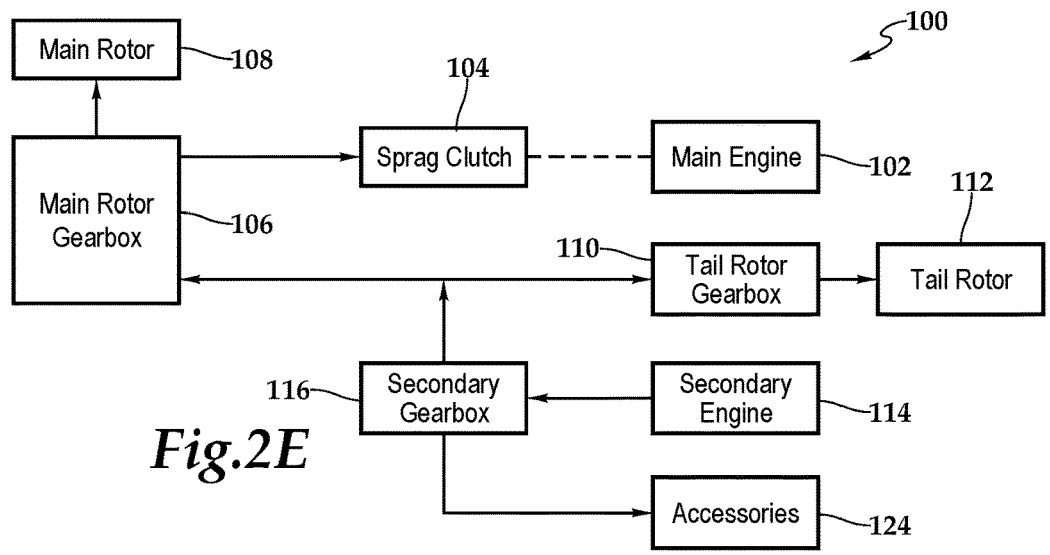

Once main engine 102 is started, torque is delivered through the main drive system as indicated by the arrows between the components within the main drive system, as best seen in FIG. 2B. In addition, the main drive system may supply torque to secondary gearbox 116, as indicated by the arrow therebetween. When power is applied to input race 136 of sprag clutch 130 via input gear 138 from the main drive system such that input race 136 and output race 140 of sprag clutch 130 are turning together at the same speed, multimode clutch assembly 128 may be operated from the unidirectional torque transfer mode to the bidirectional torque transfer mode. Specifically, bypass assembly 132 can now be shifted from the disengaged position to the engaged position responsive to pilot input and/or operation of the flight control computer of helicopter 10. In the illustrated embodiment, actuator assembly 134 provides a suitable hydraulic engagement signal to shift piston 144 to the position shown in FIG. 3B. Specifically, pressurized lubricating oil 154, as indicated by the dashed line, is received from secondary gearbox 116 at supply port 202, the pressurized lubricating oil source, and is routed to engagement chamber 146b via passageways 156a, 156b. At the same time, control valve 158 is positioned in its default or unenergized configuration such that any pressurized lubricating oil 154 in disengagement chamber 146a is routed back to secondary gearbox 116 via passageways 160a, 160b. In this manner, pressurized lubricating oil 154 in engagement chamber 146b acts on an annular area of piston 144 creating an engagement signal that biases piston 144 and bypass assembly 132 to the right in the illustrated embodiment. It should be noted that the hydraulic engagement signal acts similar to a spring in overcoming any misalignment in the clocking of the outer splines of ring gear 132b and inner splines 136a of input race 136 by maintaining pressure between ring gear 132b and input race 136 so that when bypass assembly 132 and input race 136 rotate relative to each other, the outer splines of ring gear 132b will mesh with inner splines 136a of input race 136, thereby shifting bypass assembly 132 to the engaged position and multimode clutch assembly 128 to the bidirectional torque transfer mode, as best seen in FIG. 3B.

In the bidirectional torque transfer mode of multimode clutch assembly 128, when input race 136 of sprag clutch 130 is driven by the main drive system, bypass assembly 132 and output race 140 rotate therewith. In addition, when output race 140 of sprag clutch 130 is driven by secondary engine 114, bypass assembly 132 and input race 136 rotate therewith to supply power to main drive system, thereby bypassing the overrunning mode of sprag clutch 130 such that multimode clutch assembly 128 operates with the functionality of a connected shaft. This is considered to be the default configuration of actuator assembly 134 and is the preferred configuration of actuator assembly 134 during all flight modes, wherein pressurized lubricating oil 154 in engagement chamber 146b provides a continual engagement signal that biases bypass assembly 132 to the engaged position while disengagement chamber 146a is in an unenergized state.

Actuation assembly 134 has a failsafe feature in the form of lock assembly 162 that maintains bypass assembly 132 in the engaged position during flight even if oil pressure in secondary gearbox 116 is lost. In the illustrated embodiment, lock assembly 162 is in fluid communication with engagement chamber 146b via passageway 164 such that lock assembly 162 remains in an unlocked state as long as the engagement signal is present but shifts to a locked state when the engagement signal is absent. As best seen in FIG. 4A, when the engagement signal is present, pressure in chamber 166 acts on piston 168, as indicated by the large pressure arrows, which overcomes the biasing force exerted on piston 168 by spring 170. In this position, piston 168 is disengaged from spool assembly 150 enabling spool assembly 150 and thus piston 144 and bypass assembly 132 to be shifted, as indicated by the movement arrow 172. As best seen in FIG. 4B, If the engagement signal is lost due to a failure in the lubrication system of secondary gearbox 116 or other fault, lock assembly 162 shifts to the locked position when the pressure in chamber 166, as indicated by the small pressure arrows, becomes insufficient to overcome the biasing force exerted on piston 168 by spring 170. In this position, piston 168 engages spool assembly 150 preventing spool assembly 150 and thus piston 144 and bypass assembly 132 from shifting. Importantly, if such a fault occurs during flight, lock assembly 162 prevents bypass assembly 132 from being able to shift from the engaged position to the disengaged position, thus locking multimode clutch assembly 128 in the failsafe bidirectional torque transfer mode.

Returning to FIG. 2C, when bypass assembly 132 is in the engaged position, bypass assembly 132 couples input race 136 with output race 140 such that multimode clutch assembly 128 is in the bidirectional torque transfer mode. In this configuration, secondary engine 114 may be operated in standby mode or powered down as indicated by the dashed line between secondary engine 114 and secondary gearbox 116, such that main engine 102 is driving not only the main drive system but also accessories 124, as indicated by the arrows to secondary gearbox 116 and accessories 124. This configuration of powertrain 100 may be referred to as a high efficiency configuration. In addition, secondary engine 114 may be operated to provide supplemental power to the main drive system as indicated by the arrow between secondary gearbox 116 and the tail rotor drive shaft in FIG. 2D. This configuration of powertrain 100 may be referred to as an enhanced power configuration in which both main engine 102 and secondary engine 114 may provide power to main rotor 108 during high power demand flight operations.

Continuing with the operating scenarios of helicopter 10, once multimode clutch assembly 128 is in the bidirectional torque transfer mode, helicopter 10 is ready for takeoff. Assuming a high power demand takeoff and/or hover, powertrain 100 is preferably in the enhanced power configuration of FIG. 2D for takeoff. Once helicopter 10 has completed the takeoff and is flying at a standard speed cruise, it may be desirable to place secondary engine 114 in standby mode such as idle operations or even shut secondary engine 114 down to operate helicopter 10 in the high efficiency configuration depicted in FIG. 2C. In this configuration, secondary engine 114 provide no power as indicated by the dashed line between secondary engine 114 and secondary gearbox 116 with torque and rotational energy being provided by main engine 102 through the main drive system to secondary gearbox 116 and accessories 124. More specifically, power from the main drive system is transferred through multimode clutch assembly 128 to output gear 126 by input race 136 and output race 140 that are coupled together by bypass assembly 132 then by shaft 122a and output race 122 of sprag clutch 118. Rotational energy is not sent to input race 120, as sprag clutch 118 is operating in its overrunning mode. Thus, in addition to powering main rotor 108 and tail rotor 112, in the high efficiency configuration of powertrain 100, main engine 102 also powers accessories 124.

It should be noted that multimode clutch assembly 128 is preferably maintained in its bidirectional torque transfer mode during all flight operations. For example, having multimode clutch assembly 128 in its bidirectional torque transfer mode is a safety feature of helicopter 10 in the event of a failure in main engine 102 during flight, as indicated by the dashed lines between main engine 102 and sprag clutch 104 in FIG. 2E. In this case, an autorotation maneuver may be performed in which the descent of helicopter 10 creates an aerodynamic force on main rotor 108 as air moves up through main rotor 108 generating rotational inertia. Upon final approach during the autorotation landing, helicopter 10 performs a flare recovery maneuver in which the kinetic energy of main rotor 108 is converted into lift using aft cyclic control. Both the autorotation maneuver and the flare recovery maneuver are enhanced by operating secondary engine 114 and sending power through secondary gearbox 116 to the main drive system, as indicated by the arrow therebetween, and more particularly by sending power to main rotor 108 as indicated by the arrows leading thereto. It is noted that rotational energy is also sent to sprag clutch 104, which is operating in its overrunning mode while main engine 102 is not operating. This configuration may be referred to as the enhanced autorotation configuration of powertrain 100 in which main engine 102 is not operating but secondary engine 114 is providing power to main rotor 108 through multimode clutch assembly 128, which is in the bidirectional torque transfer mode.

Continuing with the operating scenarios of helicopter 10, after a conventional landing, when it is desired to operate multimode clutch assembly 128 from the bidirectional to the unidirectional torque transfer mode, main engine 102 continues to provide torque and rotational energy to input race 136, which in turn drives output race 140 of sprag clutch 130. In addition, secondary engine 114 is operated to drive input race 120 and output race 122 at the same rotational speed as input race 136. Actuator assembly 134 now provides a hydraulic disengagement signal to shift piston 144 to the position shown in FIG. 3A. Specifically, pressurized lubricating oil 154 from secondary gearbox 116 is routed to disengagement chamber 146a via control valve 158 and passageway 160a, with control valve 158 in an energized configuration. The pressurized lubricating oil 154 in disengagement chamber 146a acts on an annular area of piston 144 creating a disengagement signal that biases piston 144 and bypass assembly 132 to the left in the illustrated embodiment. As the annular area of piston 144 is larger in disengagement chamber 146a than the annular area of piston 144 in engagement chamber 146b, the disengagement signal overcomes the engagement signal. In this manner, the disengagement signal shifts piston 144 to the position shown in FIG. 3A such that the outer splines of ring gear 132b shift out of mesh with inner splines 136a of input race 136, thereby shifting bypass assembly 132 to the disengaged position.

As best seen in FIG. 4C, shifting bypass assembly 132 to the disengaged position also shift spool assembly 150 relative to piston 168. As best seen in FIG. 4D, when the various systems of helicopter 10 are powered down including main engine 102, secondary engine 114 and secondary gearbox 116, and the engagement signal is lost, the biasing force exerted on piston 168 by spring 170 causing piston 168 to engage spool assembly 150 preventing spool assembly 150 and thus piston 144 and bypass assembly 132 from shifting. In this case, lock assembly 162 prevents bypass assembly 132 from being able to shift from the disengaged position to the engaged position, thus locking multimode clutch assembly 128 in the unidirectional torque transfer mode.

In some embodiments, it may be desirable to manually control lock assembly 162 and bypass assembly 132 when helicopter 10 is landed and not operating. As best seen in FIGS. 5A-5B, piston 168 includes a piston extension 168a with a handle 168b that extends through an opening in the housing of lock assembly 162. In addition, spool assembly 150 includes a handle 150a. In this embodiment, handle 168b can be accessed and manipulated manually or using a tool such that piston 168 can be moved from the locked position (FIG. 5A) to the unlocked position (FIG. 5B) by overcoming the force of spring 170. While piston 168 is maintained in the unlocked position, handle 150b can be accessed and manipulated manually or using a tool such that spool assembly 150, piston 144 and bypass assembly 132 can be shifted, as indicated by movement arrow 172, enabling bypass assembly 132 to be actuated between the disengaged position (FIG. 3A) and the engaged position (FIG. 3B).

Referring again to FIGS. 3A-3B, the lubrication strategy for secondary gearbox 116 will now be described. Secondary gearbox 116 has a lubrication circuit that utilizes pressurized lubricating oil 154. The lubrication circuit includes an oil pump (not pictured) that pressurizes and routes lubricating oil to secondary gearbox 116 and in particular to supply port 202. Pressurized lubricating oil 154 is then routed to the interior of piston 144 via passageways 156a, 156b and engagement chamber 146b. From piston 144, pressurized lubricating oil 154 flows into oil jet 148 that includes a plurality of nozzles that direct pressurized lubricating oil 154 into specific regions within shaft 122a defined between adjacent oil dams such as regions 212, 214, 216, 218, 220, 222. The centrifugal force generated by rotation of shaft 122a during operation of helicopter 10 aids in oil flow from the interior of shaft 122a to the desired locations within secondary gearbox 116. For example, pressurized lubricating oil 154 from region 212 flows to ball bearing set 152 for lubrication thereof. Similarly, pressurized lubricating oil 154 from region 216 flows to sprag clutch 130 to provide lubrication for the sprag elements between input race 136 and output race 140. Likewise, pressurized lubricating oil 154 from region 222 flows to sprag clutch 118 to provide lubrication for the sprag elements between input race 120 and output race 122.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A failsafe multimode clutch assembly for a rotorcraft, the clutch assembly comprising:
   a freewheeling unit having an input race and an output race, the freewheeling unit having a driving mode in which torque applied to the input race is transferred to the output race and an overrunning mode in which torque applied to the output race is not transferred to the input race;
   a bypass assembly having an engaged position in which the bypass assembly couples the input and output races of the freewheeling unit and a disengaged position in which the bypass assembly does not couple the input and output races of the freewheeling unit;
   an actuator assembly configured to utilize a pressurized lubricating oil to generate an engagement signal that biases the bypass assembly toward the engaged position and a disengagement signal that biases the bypass assembly toward the disengaged position; and
   a lock assembly in fluid communication with the engagement signal, the lock assembly enabling actuation of the bypass assembly when the engagement signal is present and disabling actuation of the bypass assembly when the engagement signal is absent;
   wherein, in the disengaged position of the bypass assembly, the overrunning mode of the freewheeling unit is enabled such that the clutch assembly is configured for unidirectional torque transfer from the input race to the output race; and
   wherein, in the engaged position of the bypass assembly, the overrunning mode of the freewheeling unit is disabled such that the clutch assembly is configured for bidirectional torque transfer between the input and output races.

2. The clutch assembly as recited in claim 1 wherein the actuator assembly further comprises a liner and a piston, the piston slidably disposed relative to the liner and coupled to the bypass assembly, the piston and the liner defining engagement and disengagement chambers;
   wherein, when the pressurized lubricating oil pressurizes the engagement chamber and does not pressurize the disengagement chamber, the bypass assembly is biased toward the engaged position; and
   wherein, when the pressurized lubricating oil pressurizes the engagement chamber and pressurizes the disengagement chamber, the bypass assembly is biased toward the disengaged position.

3. The clutch assembly as recited in claim 2 wherein the engagement chamber and the disengagement chamber define differential areas; and
   wherein, the disengagement chamber has a larger area than the engagement chamber.

4. The clutch assembly as recited in claim 2 wherein the engagement chamber and the disengagement chamber define annular differential areas; and
   wherein, the disengagement chamber has a larger annular area than the engagement chamber.

5. The clutch assembly as recited in claim 2 further comprising a control valve disposed between a pressurized lubricating oil source and the disengagement chamber, the control valve configured to selectively allow and prevent communication of the pressurized lubricating oil to the disengagement chamber.

6. The clutch assembly as recited in claim 5 wherein the control valve is configured to selectively allow and prevent discharge of the pressurized lubricating oil from the disengagement chamber.

7. The clutch assembly as recited in claim 2 wherein the lock assembly further comprises a spool valve and wherein the piston further comprises a spool assembly;
   wherein, the lock assembly has an unlocked position in which the spool assembly is slidable relative to the spool valve when the engagement signal is present, thereby enabling actuation of the bypass assembly; and
   wherein, the lock assembly having a locked position in which the spool assembly is fixed relative to the spool valve when the engagement signal is absent, thereby disabling actuation of the bypass assembly.

8. The clutch assembly as recited in claim 7 wherein the spool valve includes a spring assembly and a spool valve piston;

wherein, the spring assembly biases the spool valve piston toward the locked position to provide a failsafe configuration when the engagement signal is absent; and wherein, the spool valve piston is in fluid communication with the engagement chamber such that the spool valve piston is biased toward the unlocked position when the engagement signal acts on the spool valve piston.

9. The clutch assembly as recited in claim 1 further comprising a control valve configured to selectively allow and prevent communication of the disengagement signal.

10. The clutch assembly as recited in claim 1 wherein the lock assembly further comprises a spring assembly that biases the lock assembly toward a locked position to provide a failsafe configuration that disables operation of the actuator assembly when the engagement signal is absent.

11. A powertrain for a rotorcraft, the powertrain comprising:
 a main drive system including a main engine;
 a secondary engine; and
 a failsafe multimode clutch assembly positioned between the main drive system and the secondary engine, the clutch assembly including:
  a freewheeling unit having an input race coupled to the main drive system and an output race coupled to the secondary engine, the freewheeling unit having a driving mode in which torque applied to the input race is transferred to the output race and an overrunning mode in which torque applied to the output race is not transferred to the input race;
  a bypass assembly having an engaged position in which the bypass assembly couples the input and output races of the freewheeling unit and a disengaged position in which the bypass assembly does not couple the input and output races of the freewheeling unit; and
  an actuator assembly configured to utilize a pressurized lubricating oil to generate an engagement signal that biases the bypass assembly toward the engaged position and a disengagement signal that biases the bypass assembly toward the disengaged position; and
  a lock assembly in fluid communication with the engagement signal, the lock assembly enabling actuation of the bypass assembly when the engagement signal is present and disabling actuation of the bypass assembly when the engagement signal is absent;
 wherein, in the disengaged position of the bypass assembly, the overrunning mode of the freewheeling unit is enabled such that the clutch assembly is configured for unidirectional torque transfer from the input race to the output race; and
 wherein, in the engaged position of the bypass assembly, the overrunning mode of the freewheeling unit is disabled such that the clutch assembly is configured for bidirectional torque transfer between the input and output races.

12. The powertrain as recited in claim 11 wherein the main engine further comprises a first gas turbine engine and wherein the secondary engine further comprises a second gas turbine engine.

13. The powertrain as recited in claim 11 wherein the main engine further comprises a gas turbine engine and wherein the secondary engine further comprises an electric motor.

14. The powertrain as recited in claim 11 wherein the secondary engine is configured to generate between about 5 percent and about 20 percent of the power of the main engine.

15. The powertrain as recited in claim 11 wherein the secondary engine is configured to generate between about 10 percent and about 15 percent of the power of the main engine.

16. A rotorcraft comprising:
 a main rotor coupled to a main drive system including a main engine;
 a secondary engine; and
 a failsafe multimode clutch assembly positioned between the main drive system and the secondary engine, the clutch assembly including:
  a freewheeling unit having an input race coupled to the main drive system and an output race coupled to the secondary engine, the freewheeling unit having a driving mode in which torque applied to the input race is transferred to the output race and an overrunning mode in which torque applied to the output race is not transferred to the input race;
  a bypass assembly having an engaged position in which the bypass assembly couples the input and output races of the freewheeling unit and a disengaged position in which the bypass assembly does not couple the input and output races of the freewheeling unit; and
  an actuator assembly configured to utilize a pressurized lubricating oil to generate an engagement signal that biases the bypass assembly toward the engaged position and a disengagement signal that biases the bypass assembly toward the disengaged position; and
  a lock assembly in fluid communication with the engagement signal, the lock assembly enabling actuation of the bypass assembly when the engagement signal is present and disabling actuation of the bypass assembly when the engagement signal is absent;
 wherein, in the disengaged position of the bypass assembly, the overrunning mode of the freewheeling unit is enabled such that the clutch assembly is configured for unidirectional torque transfer from the input race to the output race; and
 wherein, in the engaged position of the bypass assembly, the overrunning mode of the freewheeling unit is disabled such that the clutch assembly is configured for bidirectional torque transfer between the input and output races.

17. The rotorcraft as recited in claim 16 wherein, in a preflight configuration, the bypass assembly is in the disengaged position, the main engine is not operating and the secondary engine provides power to at least one rotorcraft accessory.

18. The rotorcraft as recited in claim 16 wherein, in an enhanced power configuration, the bypass assembly is in the engaged position, the main engine provides power to the main drive system and the secondary engine provides power to at least one rotorcraft accessory and to the main drive system through the clutch assembly.

19. The rotorcraft as recited in claim 16 wherein, in a high efficiency configuration, the bypass assembly is in the engaged position, the secondary engine is in standby mode and the main engine provides power to the main drive system and to at least one rotorcraft accessory through the clutch assembly.

20. The rotorcraft as recited in claim 16 wherein, in an enhanced autorotation configuration, the bypass assembly is in the engaged position, the main engine is not operating and the secondary engine provides power to the main drive system through the clutch assembly.

\* \* \* \* \*